United States Patent
Kawasaki et al.

(10) Patent No.: US 10,245,680 B2
(45) Date of Patent: Apr. 2, 2019

(54) CLADDING METHOD FOR VALVE SEAT AND PRODUCTION METHOD FOR CYLINDER HEAD

(71) Applicant: Toyota Jidosha Kabushiki Kaisha, Toyota-shi, Aichi-ken (JP)

(72) Inventors: Minoru Kawasaki, Toyota (JP); Kenji Kidera, Toyota (JP); Yoshiji Shoda, Toyoda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 398 days.

(21) Appl. No.: 14/900,910

(22) PCT Filed: May 16, 2014

(86) PCT No.: PCT/JP2014/002605
§ 371 (c)(1),
(2) Date: Dec. 22, 2015

(87) PCT Pub. No.: WO2015/001698
PCT Pub. Date: Jan. 8, 2015

(65) Prior Publication Data
US 2016/0136758 A1    May 19, 2016

(30) Foreign Application Priority Data
Jul. 1, 2013    (JP) .................. 2013-138272

(51) Int. Cl.
*B23K 26/34*    (2014.01)
*B23K 26/14*    (2014.01)
(Continued)

(52) U.S. Cl.
CPC ............ *B23K 26/34* (2013.01); *B23K 26/144* (2015.10); *B23K 26/1464* (2013.01); *F01L 3/02* (2013.01);
(Continued)

(58) Field of Classification Search
None
See application file for complete search history.

(56) References Cited

U.S. PATENT DOCUMENTS 4,004,889 A * 1/1977 Gale .................. B22F 5/00
                                                        419/2
4,125,926 A * 11/1978 Gale .................. B23K 35/286
                                                        29/888.043
(Continued)

FOREIGN PATENT DOCUMENTS

JP     H04-123885 A    4/1992
JP     H08-224682 A    9/1996
JP     H08-224683 A    9/1996

*Primary Examiner* — Ibrahime A Abraham
*Assistant Examiner* — Gyounghyun Bae
(74) *Attorney, Agent, or Firm* — Oliff PLC

(57) ABSTRACT

A cladding method for a valve seat in a cylinder head blank includes a combustion chamber, an intake port or an exhaust port communicating with the combustion chamber, and an annular countersunk groove formed in an opening end of the port on the combustion chamber side, the method being for forming a cladding layer by irradiating metal powder supplied in the countersunk groove with a laser beam. A gas flow regulating wall is provided, which projects from the countersunk groove to an inner side of the countersunk groove and to the combustion chamber side, gas is sprayed during irradiating with the laser beam, and the gas is flown by the gas flow regulating wall from the inner side to an outer side of the countersunk groove.

13 Claims, 6 Drawing Sheets

(51) Int. Cl.
*B23K 26/144* (2014.01)
*F02F 1/42* (2006.01)
*F01L 3/22* (2006.01)
*F01L 3/24* (2006.01)
*F01L 3/02* (2006.01)
*F01L 3/04* (2006.01)

(52) U.S. Cl.
CPC .............. *F01L 3/04* (2013.01); *F01L 3/22* (2013.01); *F01L 3/24* (2013.01); *F02F 1/4285* (2013.01)

(56) References Cited

U.S. PATENT DOCUMENTS

| | | | | |
|---|---|---|---|---|
| 4,452,221 A | * | 6/1984 | Keating | F02B 23/08 123/263 |
| 4,643,142 A | * | 2/1987 | Klomp | F01L 1/32 123/188.11 |
| 4,805,571 A | * | 2/1989 | Humphrey | F01L 1/348 123/25 C |
| 4,879,158 A | * | 11/1989 | Horiki | B05B 12/26 428/159 |
| 4,945,867 A | * | 8/1990 | Tanahashi | F02B 23/08 123/432 |
| 5,571,430 A | * | 11/1996 | Kawasaki | B23K 26/08 219/121.74 |
| 5,573,814 A | * | 11/1996 | Donovan | C23C 4/16 427/448 |
| 6,576,871 B1 | * | 6/2003 | Jendick | B23K 26/1435 219/121.67 |
| 6,606,975 B1 | * | 8/2003 | Caliskan | F02B 31/06 123/306 |
| 6,903,302 B2 | * | 6/2005 | Kim | B23K 26/34 219/121.61 |
| 2002/0073982 A1 | * | 6/2002 | Shaikh | C23C 24/04 123/688 |
| 2002/0157249 A1 | * | 10/2002 | Kim | B23K 26/34 29/888.44 |
| 2003/0168040 A1 | * | 9/2003 | Takamiya | F02F 1/4235 123/306 |
| 2005/0241609 A1 | * | 11/2005 | Kobayashi | F02M 35/0203 123/198 E |
| 2006/0266740 A1 | * | 11/2006 | Sato | B23K 26/144 219/121.63 |
| 2007/0012803 A1 | * | 1/2007 | Shimizu | F02M 61/162 239/497 |
| 2007/0044306 A1 | * | 3/2007 | Szela | B23K 9/04 29/889.1 |
| 2008/0168960 A1 | * | 7/2008 | Chen | F02M 25/06 123/184.21 |
| 2009/0044780 A1 | * | 2/2009 | Soverns | F01L 1/146 123/193.5 |
| 2009/0255504 A1 | * | 10/2009 | Ogino | B23K 15/0086 123/193.5 |

* cited by examiner

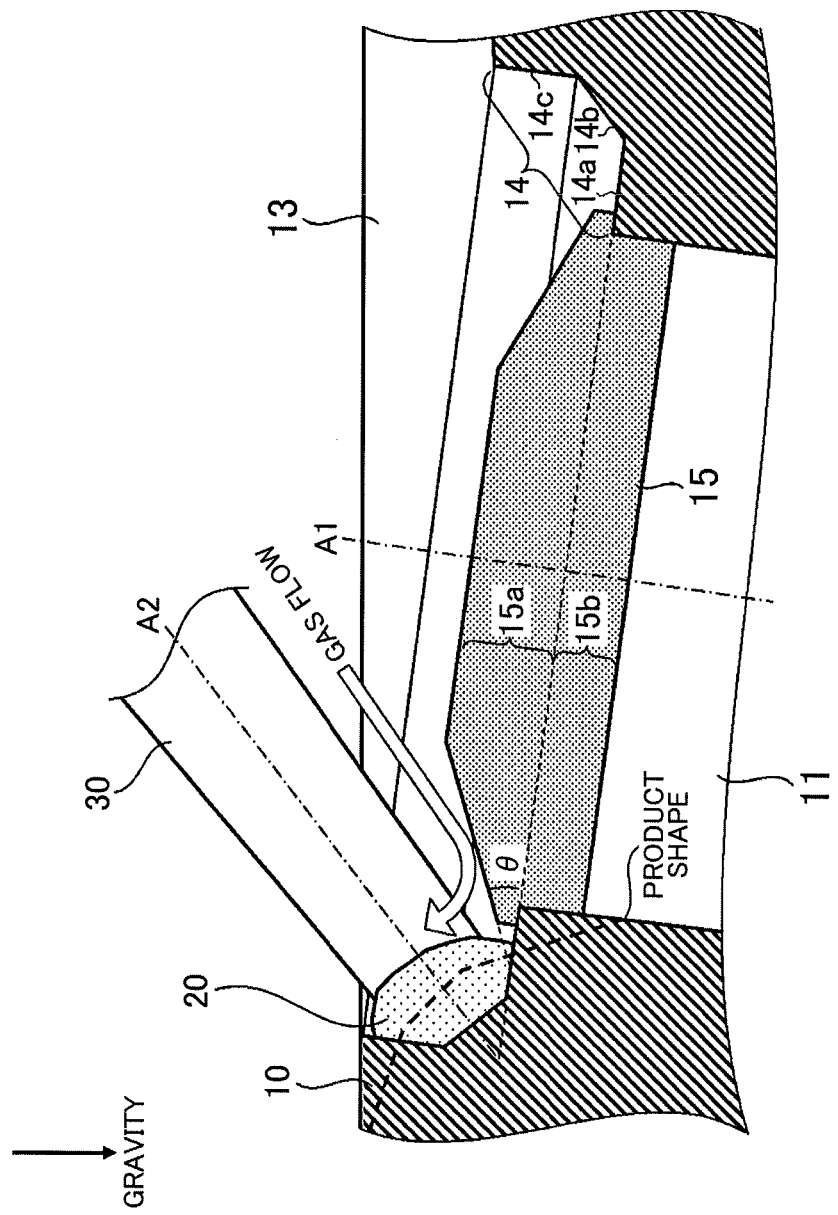

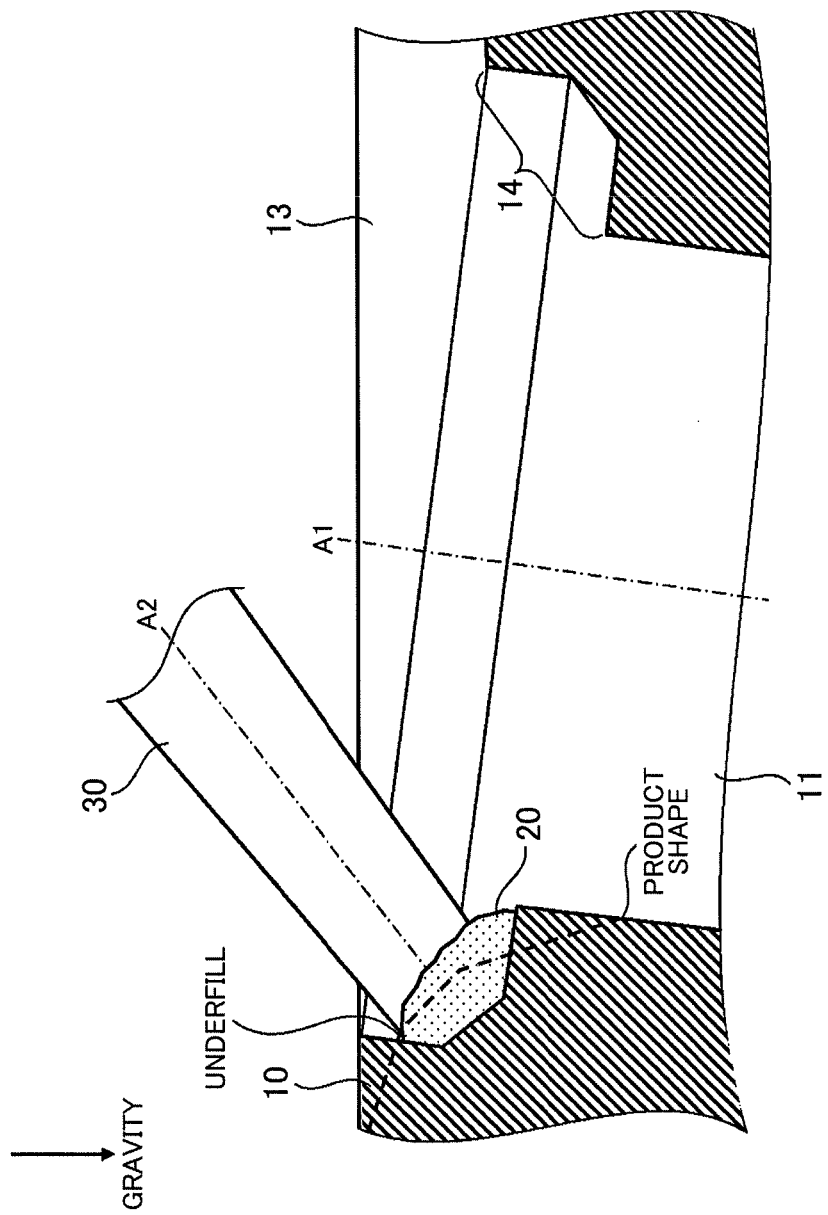

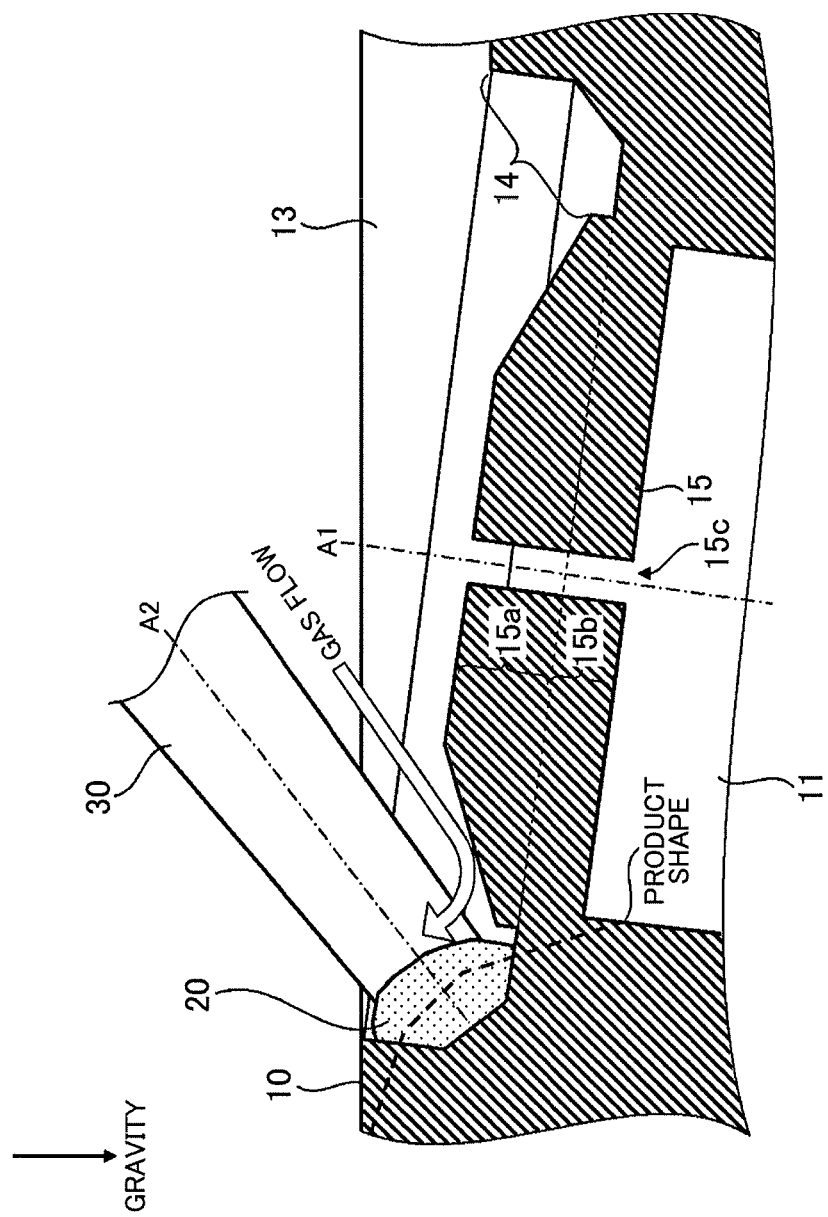

CLADDING METHOD FOR VALVE SEAT AND PRODUCTION METHOD FOR CYLINDER HEAD

TECHNICAL FIELD

The invention relates to a cladding method for a valve seat and a production method for a cylinder head.

BACKGROUND ART

In a cylinder head of an engine, a combustion chamber and intake/exhaust ports communicating with the combustion chamber are provided. Then, a valve seat, on which a back face of a valve abuts, is provided in a rim of an opening end of the intake/exhaust port on the combustion chamber side. As the valve seat and the valve abut on each other, airtightness of the combustion chamber is maintained.

Heat resistance and abrasion resistance are required for a valve seat on which a valve abuts repeatedly under a high temperature environment. Therefore, a valve seat is obtained by forming an annular countersunk groove by machining in a rim of an opening end of an intake/exhaust port of a cylinder head blank, and by forming a cladding layer, which is made from a copper based alloy or the like, in the countersunk groove.

As a cladding method for such a valve seat, a laser cladding method is known, in which a cladding layer is formed by supplying metal powder in the countersunk groove and irradiating the metal powder with a laser beam at the same time. For example, Patent Document 1 discloses a cladding method for a valve seat, in which a laser cladding method is used.

Patent Document 1: Japanese Patent Application Publication 04-123885 A (JP 04-123885 A)

SUMMARY OF THE INVENTION

The inventors have found the following problem. In the cladding method for a valve seat disclosed in Patent Document 1, because molten metal hangs down to a lower side in the vertical direction due to gravity, underfill could happen on the upper side of a formed cladding layer in the vertical direction.

The present invention has been accomplished in view of the above, and aims to provide a cladding method for a valve seat, in which underfill of a cladding layer is restrained.

A cladding method for a valve seat of a cylinder head according to an aspect of the present invention is a cladding method for a valve seat in a cylinder head blank including
  a combustion chamber,
  an intake or exhaust port communicating with the combustion chamber, and
  an annular countersunk groove formed in an opening end of the port on the combustion chamber side,
  the method being for forming a cladding layer by irradiating metal powder supplied to the countersunk groove with a laser beam, in which
  a gas flow regulating wall is provided, which projects from the countersunk groove to an inner side of the countersunk groove and to the combustion chamber side, and
  gas is sprayed during irradiation with the laser beam so that the gas is flown by the gas flow regulating wall from the inner side to an outer side of the countersunk groove.

With this structure, it is possible to restrain underfill of the cladding layer.

It is preferred that the gas is discharged from a laser machining head that emits the laser beam. Also, it is preferred that the metal powder is discharged together with the gas from the laser machining head. Further, it is preferred that an optical axis of the laser beam is coaxial with a discharge axis of the metal powder.

The gas flow regulating wall may be formed to be detachable from the cylinder head blank or may be formed integrally with the cylinder head blank.

A production method for a cylinder head according to an aspect of the present invention includes
  a step of forming a cylinder head blank provided with a combustion chamber, and an intake or exhaust port communicating with the combustion chamber,
  a step of forming an annular countersunk groove in an opening end of the port on the combustion chamber side, and
  a step of forming a cladding layer for a valve seat by irradiating metal powder supplied in the countersunk groove with a laser beam, in which
  a gas flow regulating wall, which projects from the countersunk groove to an inner side of the countersunk groove and to the combustion chamber side, is provided before the step of forming the cladding layer, and,
  in the step of forming the cladding layer, gas is sprayed during irradiation with the laser beam, and the gas is flown by the gas flow regulating wall from the inner side to an outer side of the countersunk groove.

In the step of forming the cladding layer, it is preferred that the gas is discharged from a laser machining head that emits the laser beam. Also, in the step of forming the cladding layer, it is preferred that the metal powder is discharged together with the gas from the laser machining head. Further, it is preferred that an optical axis of the laser beam is coaxial with a discharge axis of the metal powder.

The gas flow regulating wall may be formed to be detachable from the cylinder head blank, the gas flow regulating wall may be mounted on the cylinder head blank after the step of forming the countersunk groove and before the step of forming the cladding layer, and the gas flow regulating wall may be removed from the cylinder head blank after the step of forming the cladding layer. Meanwhile, in the step of forming the cylinder head blank, the gas flow regulating wall may be formed integrally with the cylinder head blank, and the gas flow regulating wall may be removed by machining from the cylinder head blank after the step of forming the cladding layer.

Furthermore, it is preferred that a step of forming a valve seat by machining the cylinder head blank in which the cladding layer is formed, is provided further.

According to the present invention, it is possible to provide a cladding method for a valve seat, in which underfill of the cladding layer is restrained.

BRIEF DESCRIPTION OF THE DRAWINGS

FIG. 4 is an enlarged view within a dotted frame in FIG. 3;

FIG. 5 is a sectional view showing details of a cladding method for a valve seat according to a comparative example of embodiment 1; and FIG. 6 is a sectional view showing details of a cladding method for a valve seat according to embodiment 2.

MODES FOR CARRYING OUT THE INVENTION

Herein below, specific embodiments, to which the present invention is applied, are explained in detail with reference to the drawings. Note that the present invention is not limited to the following embodiments. Further, the following descriptions and drawings are simplified as appropriate in order to clarify the explanation.

(Embodiment 1)

Figure 1:
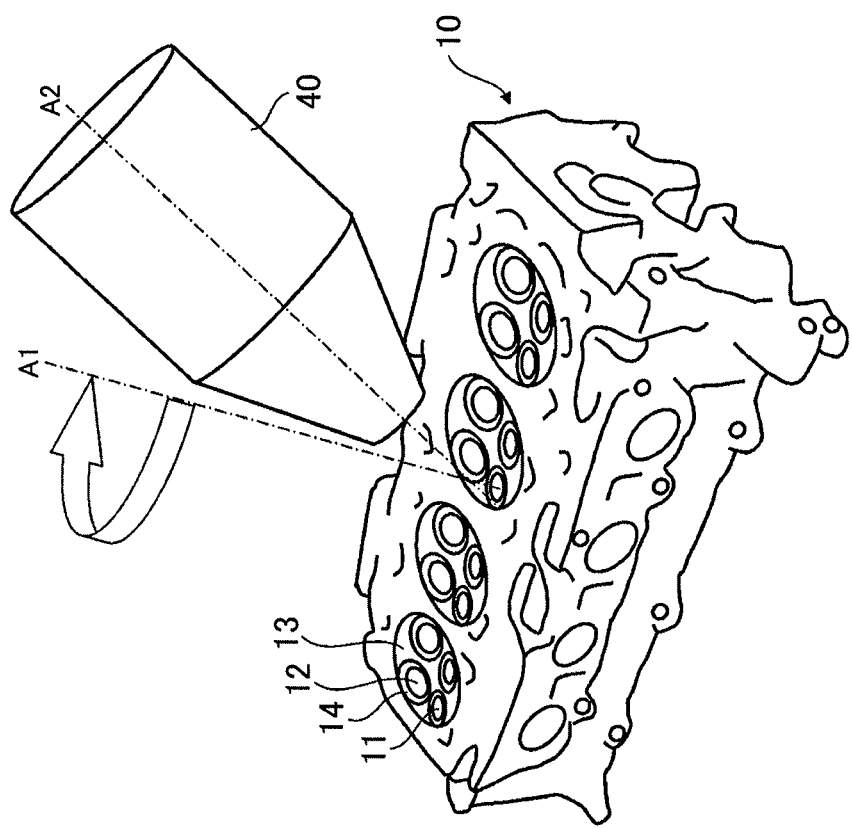
FIG. 1 is a perspective view schematically showing an outline of a cladding method for a valve seat according to embodiment 1.
Figure 2:
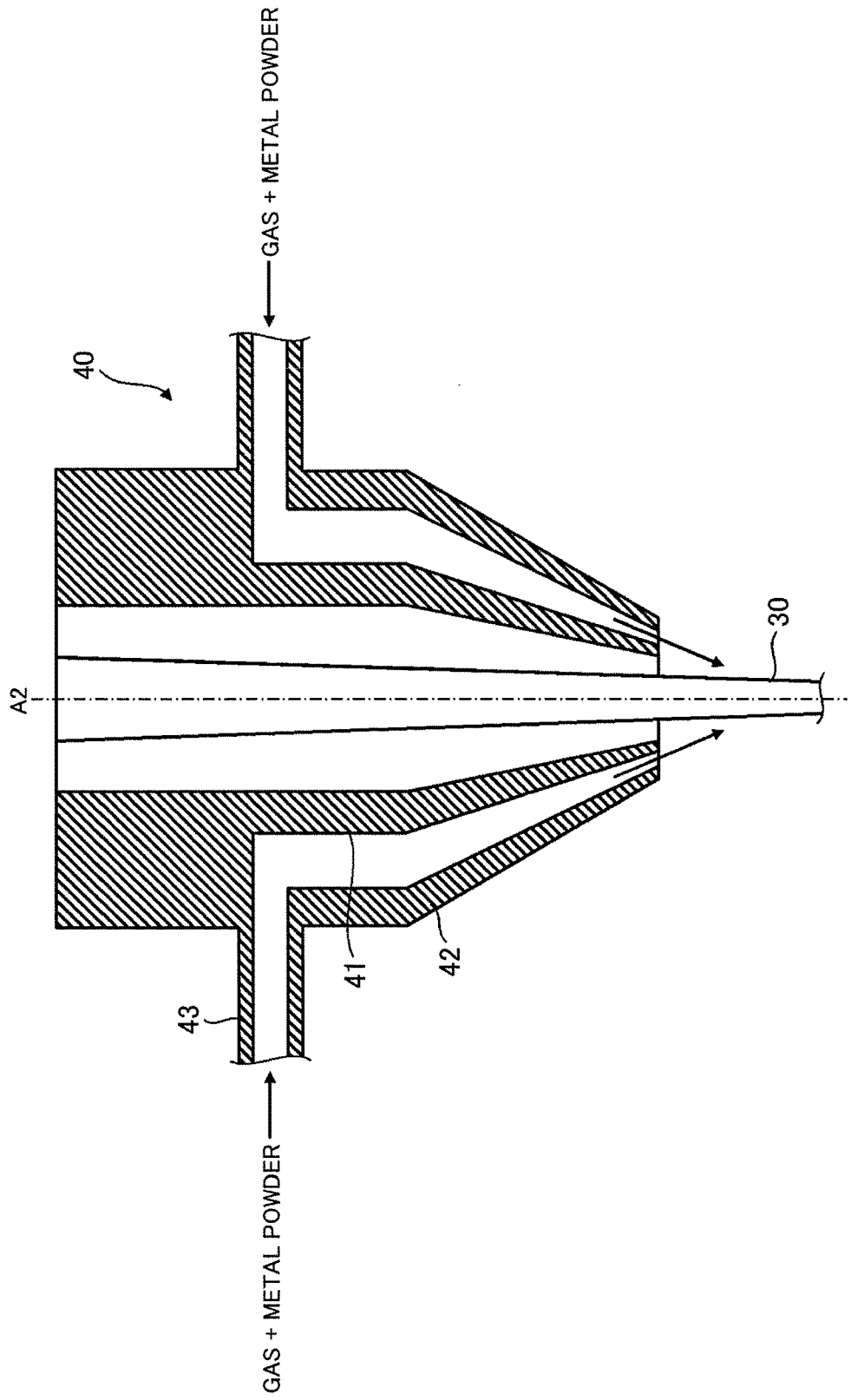
FIG. 2 is a sectional view of a laser machining head according to embodiment 1.
Figure 3:
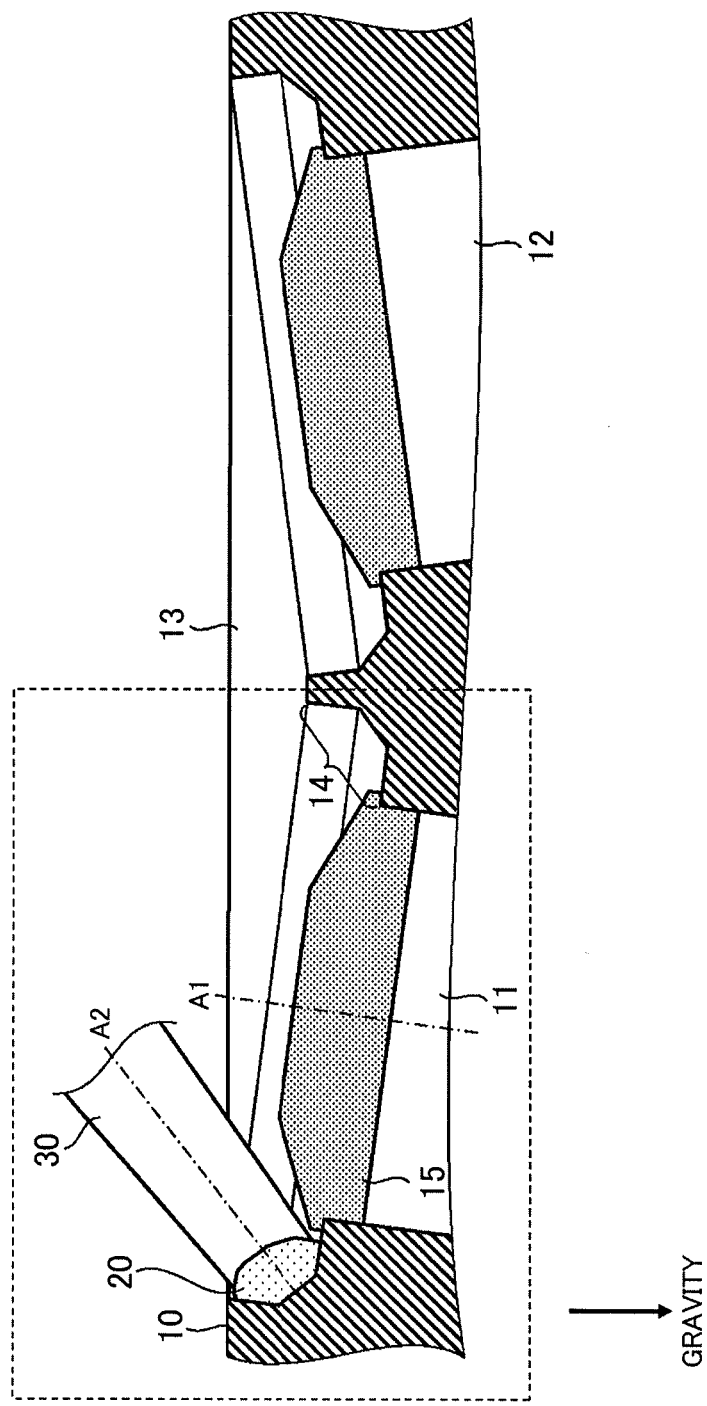
FIG. 3 is a sectional view showing details of the cladding method for a valve seat according to embodiment 1.

First of all, with reference to FIG. 1 to FIG. 4, a cladding method for a valve seat according to embodiment 1 is explained. FIG. 1 is a perspective view schematically showing an outline of the cladding method for a valve seat according to embodiment 1. FIG. 2 is a sectional view of a laser machining head according to embodiment 1. FIG. 3 is a sectional view showing details of the cladding method for a valve seat according to claim 1. FIG. 4 is an enlarged view within a dotted frame in FIG. 3.

The outline of the cladding method for a valve seat according to embodiment 1 is explained with reference to FIG. 1. First of all, a structure of a cylinder head blank 10 is explained. The cylinder head blank 10 is a casting made from, for example, cast iron or an aluminum alloy. As shown in FIG. 1, the cylinder head blank 10 includes a plurality of combustion chambers 13. Each of the combustion chambers 13 is provided with an intake port 11 and an exhaust port 12. Also, a countersunk groove 14 for forming a cladding layer is formed by machining in a rim of an opening end of each of the intake port 11 and the exhaust port 12 on the combustion chamber 13 side.

The cylinder head blank 10 shown in FIG. 1 is for a 16-valve 4-cylinder, and each of the combustion chambers 13 is provided with two intake ports 11 and two exhaust ports 12. As a matter of course, the numbers of the combustion chambers 13, the intake ports 11, and the exhaust ports 12 are not limited to the example in FIG. 1, and are decided appropriately.

As shown in FIG. 1, a cladding layer is formed by supplying metal powder in the counter groove 14 from a laser machining head 40 and irradiating the metal powder with a laser beam (an optical axis A2) at the same time. As the laser machining head 40 turns around about a central axis A1 of the annular countersunk groove 14, it is possible to form the cladding layer in the whole circumference of the countersunk groove 14. The central axis A1 is an axis that passes the center of the countersunk groove 14 and is vertical to a bottom face of the countersunk groove 14.

Next, with reference to FIG. 2, a structure of the laser machining head 40 is explained. The laser machining head 40 is provided with an inner nozzle 41, an outer nozzle 42, and a raw material supply pipe 43. In other words, the laser machining head 40 has a coaxial double pipe structure made from the inner nozzle 41 and the outer nozzle 42 that share the optical axis A2 of the laser beam 30 as their central axes. Specifically, the laser beam 30 is emitted from the inner nozzle 41. Further, inert gas and metal powder, which are supplied through a raw material supply pipe 43, are discharged between the inner nozzle 41 and the outer nozzle 42.

In short, a discharge axis of the metal powder and the inert gas is coaxial with the optical axis A2 of the laser beam 30. The inert gas may be, for example, argon gas and nitrogen gas. As stated above, because irradiation with the laser beam and supply of the metal powder and the inert gas are integrated, it is possible to make a laser machining apparatus compact. Note that, in FIG. 1, the raw material supply pipe 43 is omitted.

Next, with reference to FIG. 3 and FIG. 4, details of the cladding method for a valve seat according to embodiment 1 are explained. First of all, as shown in FIG. 3, in the cladding method for a valve seat according to claim 1, a gas flow regulating wall 15 is provided in end parts of the intake port 11 and the exhaust port 12 on the combustion chamber 13 side in the cylinder head blank 10. The gas flow regulating wall 15 is for regulating a gas flow that is used to discharge the metal powder from the laser machining head 40. Since the cladding method for a valve seat is the same on the intake port 11 side and on the exhaust port 12 side, explanation is given with regard to the intake port 11 side.

First of all, as shown in FIG. 4, the annular countersunk groove 14 is formed by machining in the rim of the opening end of the intake port 11 on the combustion chamber 13 side in the cylinder head blank 10. The countersunk groove 14 is provided with a bottom face 14a, an inclined plane 14b, and a side wall 14c. A defect easily happens in a cladding layer 20 at a corner part of the countersunk groove 14. However, due to the inclined plane 14b provided between the bottom face 14a and the side wall 14c, a defect of the cladding layer 20 at the corner part of the countersunk groove 14 is restrained.

Next, while supplying the metal powder in the counter groove 14 from the laser machining head 40, the metal powder is irradiated with a laser beam (the optical axis A2). Thus, the metal powder melts and solidifies inside the countersunk groove 14, thereby forming the cladding layer 20. Here, since the laser machining head 40 turns around about the central axis A1 of the annular countersunk groove 14, it is possible to form the cladding layer 20 in the whole circumference of the countersunk groove 14.

As stated above, in the cladding method for a valve seat according to embodiment 1, the gas flow regulating wall 15 is provided in the opening end of the intake port 11 on the combustion chamber 13 side in the cylinder head blank 10. As shown in FIG. 4, the gas flow regulating wall 15 projects in a radially inward direction of the countersunk groove 14 and towards the combustion chamber 13 side from the bottom face 14a. The gas flow regulating wall 15 according to this embodiment is mounted on the opening end of the intake port 11 on the combustion chamber 13 side in a detachable manner. Specifically, the gas flow regulating wall 15 is mounted before the cladding layer 20 is formed, and is removed after the cladding layer 20 is formed. The gas flow regulating wall 15 is provided with a projecting part 15a, which projects from the bottom face 14a of the countersunk groove 14 towards the combustion chamber 13 side, and a fitting part 15b to be fitted to the intake port 11. The projecting part 15a carries a function of regulating a gas flow.

Gas discharged from the laser machining head 40 collides with the gas flow regulating wall 15 (the projecting part 15a) and rebounds. Then, a gas flow from an inner side to an outer side of the annular countersunk groove 14 is generated. Due to such a gas flow, the cladding layer 20 in a molten state is pushed to the upper side in the vertical direction against gravity along the side wall 14c of the countersunk groove 14. Therefore, it is possible to restrain underfill on the upper side of the cladding layer 20 in the vertical direction. After the cladding layer 20 is formed, machining is performed along a broken line shown in FIG. 4 to obtain a product shape. Thus, a cylinder head having a valve seat is produced. As shown in FIG. 4, it is possible to ensure a sufficient thickness even in an end part of the cladding layer 20 on the upper side in the vertical direction.

Further, it is preferred that an inclination angle θ(>0°) of a side surface of the projecting part 15a with respect to the bottom face 14a of the countersunk groove 14 is smaller than an inclination angle of the optical axis A2 of the laser beam 30 with respect to the bottom face 14a of the countersunk groove 14. Thus, it is possible to prevent interference between the laser beam 30 and the projecting part 15a of the gas flow regulating wall 15.

Here, with reference to FIG. 5, a cladding method for a valve seat according to a comparative example of embodiment 1 is explained. FIG. 5 is a sectional view showing details of the cladding method for a valve seat according to the comparative example of embodiment 1. FIG. 5 according to the comparative example corresponds to FIG. 4 according to embodiment 1. As shown in FIG. 5, in the cladding method for a valve seat according to the comparative example, a gas flow regulating wall 15 is not provided in a cylinder head blank 10. Therefore, a gas flow directed towards an outer side from an inner side of an annular countersunk groove 14 is not generated. Hence, no force acts for pushing up a cladding layer 20 in a molten state to an upper side in a vertical direction against gravity along a side wall 14c of the countersunk groove 14. In short, as shown in FIG. 5, as the cladding layer 20 in the molten state hangs down to a lower side in the vertical direction due to gravity, underfill happens on the upper side of the cladding layer 20 in the vertical direction.

On the contrary, in the cladding method for a valve seat according to embodiment 1, the gas flow regulating wall 15, which projects to the inner side (the center side) of the countersunk groove 14 and the combustion chamber 13 side, is provided in the end part of the intake port 11 on the combustion chamber 13 side in the cylinder head blank 10. Thus, a gas flow from the inner side towards the outer side of the annular countersunk groove 14 is generated. Then, due to the gas flow regulated by the gas flow regulating wall 15, the cladding layer 20 in the molten state is pushed up to the upper side in the vertical direction along the side wall 14c of the countersunk groove 14. In other words, due to the gas flow regulating wall 15, the gas flow is generated, which pushes up the cladding layer 20 in the molten state to the upper side in the vertical direction along the side wall 14c of the countersunk groove 14. Therefore, it is possible to effectively restrain underfill on the upper side of the cladding layer 20 in the vertical direction.

(Embodiment 2)

Next, with reference to FIG. 6, a cladding method for a valve seat according to embodiment 2 is explained. FIG. 6 is a sectional view showing details of the cladding method for a valve seat according to embodiment 2. FIG. 6 according to embodiment 2 corresponds to FIG. 4 according to embodiment 1. In the cladding method for a valve seat according to embodiment 1, the gas flow regulating wall 15 is detachable from the cylinder head blank 10. On the other hand, in the cladding method for a valve seat according to embodiment 2, a gas flow regulating wall 15 is formed integrally with a cylinder head blank 10. In short, the gas flow regulating wall 15 is formed by casting. Therefore, a through hole 15c is formed in the center of the gas flow regulating wall 15.

Similarly to embodiment 1, the gas flow regulating wall 15 according to embodiment 2 projects to the inner side of an annular countersunk groove 14 and to a combustion chamber 13 side from a bottom face 14a. Also, the gas flow regulating wall 15 according to this embodiment is removed by machining after a cladding layer 20 is formed. The gas flow regulating wall 15 is provided with a projecting part 15a, which projects towards the combustion chamber 13 side from the bottom face 14a of the countersunk groove 14, and a fixed part 15b to be fixed to the cylinder head blank 10.

The projecting part 15a carries a function of regulating a gas flow.

Similarly to embodiment 1, in the cladding method for a valve seat according to embodiment 2, the gas flow regulating wall 15 projecting to the inner side of the countersunk groove 14 and to the combustion chamber 13 side is also provided in an end part of an intake port 11 on the combustion chamber 13 side in the cylinder head blank 10. Therefore, a gas flow from the inner side to the outer side of the annular countersunk groove 14 is generated. Then, a gas flow regulated by the gas flow regulating wall 15 pushes up a cladding layer 20 in a molten state to an upper side in a vertical direction against gravity along a side wall 14c of the countersunk groove 14. Therefore, it is possible to effectively restrain underfill on the upper side of the cladding layer 20 in the vertical direction.

The present invention is not limited to the foregoing embodiments, and changes may be made as appropriate without departing from the gist thereof.

For example, metal powder, which is a raw material for the cladding layer 20, may be supplied in the countersunk groove 14 by using a nozzle separated from the laser machining head 40. Also, it is not necessary to discharge inert gas from the same laser machining head.

Moreover, a position of the cylinder head blank 10 may be adjusted so that the central axis A1 of the countersunk groove 14 in each of the intake port 11 and the exhaust port 12 coincides with the vertical direction.

This application claims priority based on Japanese Patent Application No. 2013-138272 filed on Jul. 1, 2013, which is incorporated herein by reference in its entirety.

DESCRIPTION OF SYMBOLS

10: CYLINDER HEAD BLANK
11: INTAKE PORT
12: EXHAUST PORT
13: COMBUSTION CHAMBER
14: COUNTERSUNK GROOVE
14a: BOTTOM FACE
14b: INCLINED PLANE
14c: SIDE WALL
15: GAS FLOW REGULATING WALL
15a: PROJECTING PART
15b: FITTING PART (FIXED PART)
15c: THROUGH HOLE
20: CLADDING LAYER
30: LASER BEAM
40: LASER MACHINING HEAD
41: INNER NOZZLE
42: OUTER NOZZLE
43: RAW MATERIAL SUPPLY PIPE

What is claimed is:

1. A cladding method for a valve seat in a cylinder head blank provided with an intake port and an exhaust port communicating with a combustion chamber, comprising:

forming an annular countersunk groove in an opening end of at least one of the intake port and the exhaust port on a combustion chamber side, providing a gas flow regulating wall which projects from the annular countersunk groove to an inner side of the annular countersunk groove and to the combustion chamber side, the gas flow regulating wall having an upper surface that faces toward the combustion chamber side and that inclines upwardly as the upper surface progresses from an edge of the annular countersunk groove toward a center of the annular countersunk groove, supplying metal powder to the annular countersunk groove, spraying gas on the metal powder and flowing the gas by the upper surface of the gas flow regulating wall from the inner side to an outer side of the annular countersunk groove, while the metal powder is irradiated with a laser beam to form a cladding layer, the flowing of the gas pushing the cladding layer in a molten state toward the outer side of the annular countersunk groove, and removing the gas flow regulating wall from the cylinder head blank after the cladding layer has been formed.

2. The cladding method according to claim 1, wherein the gas is discharged from a laser machining head that emits the laser beam.

3. The cladding method according to claim 2, wherein the metal powder is discharged together with the gas from the laser machining head.

4. The cladding method according to claim 2, wherein an optical axis of the laser beam is coaxial with a discharge axis of the metal powder.

5. The cladding method according to claim 1, wherein the gas flow regulating wall is formed integrally with the cylinder head blank.

6. The cladding method according to claim 1, wherein the gas flow regulating wall is formed so as to be detachable from the cylinder head blank.

7. A production method for a cylinder head, comprising:
a first step of forming a cylinder head blank provided with an intake port and an exhaust port communicating with a combustion chamber;
a second step of forming an annular countersunk groove in an opening end of at least one of the intake port and the exhaust port on a combustion chamber side;
a third step of providing a gas flow regulating wall projecting from the annular countersunk groove to an inner side of the annular countersunk groove and to the combustion chamber side, the gas flow regulating wall having an upper surface that faces toward the combustion chamber side and that inclines upwardly as the upper surface progresses from an edge of the annular countersunk groove toward a center of the annular countersunk groove;
a fourth step of forming a cladding layer for a valve seat by supplying metal powder in the annular countersunk groove, and spraying gas to the metal powder and flowing the gas by the upper surface of the gas flow regulating wall from the inner side to an outer side of the annular countersunk groove, while the metal powder is irradiated with a laser beam, the flowing of the gas pushing the cladding layer in a molten state toward the outer side of the annular countersunk groove; and
removing the gas flow regulating wall from the cylinder head blank after the fourth step.

8. The production method according to claim 7, wherein, in the fourth step, the gas is discharged from a laser machining head that emits the laser beam.

9. The production method according to claim 8, wherein, in the fourth step, the metal powder is discharged together with the gas from the laser machining head.

10. The production method according to claim 8, wherein an optical axis of the laser beam is coaxial with a discharge axis of the metal powder.

11. The production method according to claim 7, wherein the gas flow regulating wall is formed integrally with the cylinder head blank, and
the gas flow regulating wall is removed by machining from the cylinder head blank after the fourth step.

12. The production method according to claim 7, further comprising a fifth step of forming a valve seat by machining the cylinder head blank in which the cladding layer has been formed.

13. The production method according to claim 7, wherein the gas flow regulating wall is formed so as to be detachable from the cylinder head blank, and
the gas flow regulating wall is mounted on the cylinder head blank after the second step and before the fourth step.

* * * * *